United States Patent [19]

Toyoda

[11] 3,879,755

[45] Apr. 22, 1975

[54] TAPE FEED CONTROL APPARATUS

[75] Inventor: Moriaki Toyoda, Yokohama, Japan

[73] Assignee: Denki Onkyo Co., Ltd., Tokyo, Japan

[22] Filed: May 7, 1974

[21] Appl. No.: 467,720

[30] Foreign Application Priority Data

May 21, 1973 Japan .......................... 48-57001

[52] U.S. Cl. ... 360/72; 179/100.1 R; 179/100.1 PS; 360/72

[51] Int. Cl. .................. G11b 15/18; G11b 27/14; G11b 27/20

[58] Field of Search ............ 360/72, 71, 74, 69, 27, 360/90; 179/100.1 PS, 100.1 R; 242/186, 188, 201-203; 226/49, 16, 24, 33, 43

[56] References Cited

UNITED STATES PATENTS

| | | | |
|---|---|---|---|
| 2,496,103 | 1/1950 | Neufeld | 360/27 |
| 3,426,339 | 2/1969 | Rich et al. | 179/100.1 PS |
| 3,467,791 | 9/1969 | Bolick, Jr. | 179/100.1 R |
| 3,518,379 | 6/1970 | Walburn | 179/100.1 PS |
| 3,541,271 | 11/1970 | Joslow et al. | 360/72 |
| 3,620,476 | 11/1971 | Cervantes | 360/69 |
| 3,757,057 | 9/1973 | Fleming | 179/100.1 R |
| 3,770,281 | 11/1973 | Walburn | 360/74 |

*Primary Examiner*—Alfred H. Eddleman
*Attorney, Agent, or Firm*—Armstrong, Nikaido & Wegner

[57] ABSTRACT

A tape feed control apparatus which is provided with a pair of rotating means which rotate respectively both in forward and reverse directions as the tape is fed, each rotating means being adapted to be manually reset to the specified position and is adapted to stop a tape being rewound or fast-forwarded at a position extremely close a position obtained by resetting one of said rotating means after the tape has passed said position due to inertia and is slightly returned in a reverse direction.

11 Claims, 15 Drawing Figures

TAPE FEED CONTROL APPARATUS

BACKGROUND OF THE INVENTION

The present invention relates to a control apparatus which is adapted to control, at a desired position, a state of a tape being fed, that is, fast forward feed, rewind, forward play or reverse play on a tape recorder or tape player.

In cases of the conventional tape recorders and tape players, when it is necessary to reproduce again the sound from a desired point after reproducing the sound recorded in a tape, the tape is rewound back exceeding said point, and then the reproduction is performed. For identifying the specified point in advance by the counter, a push button is operated to stop feeding of the tape when the counter indicates said specified point during rewinding, and then the reproduction is performed by using the other push button.

Since the rewinding is generally performed at a high speed, the tape is stopped at a position to which the tape is rewound up further than desired even though the push button is operated when the counter indicates the specified figure. Accordingly, the reproduction after stopping contains an unnecessary part of the record. This fact greatly affect in particular the editing of the tape. A similar problem is found in an operation to start recording from the specified point during rewinding.

Also, in case of conventional equipment, a silver foil is applied onto the surface of a magnetic tape to form a conductive surface and an apparatus which changes a feeding mode of the tape when a contact detects said conductive surface. This type of apparatus is disadvantageous because the tape should be provided in advance with a conductive surface and it is difficult to control the tape at a desired position during feed. When controlling the tape being fed at a high speed in such the apparatus as described above, the actual position where the tape is stopped deviates from the desired stopping position. Thus the conventional apparatuses accompany such the problem.

The first object of the present invention is to provide an apparatus capable of automatically returning the tape, which is over-fed exceeding the specified position due to inertia to the specified position and stopping the tape at the specified position during rewinding or fast feed.

The second object is to provide an apparatus capable of starting slow feed of the tape for automatic reproduction or recording after stopping the tape at the specified position as described above.

Moreover, the third additional object is to provide an apparatus capable of controlling the tape being fed at any time without previous setting.

SUMMARY

A tape feed control apparatus comprising a first rotating means which rotates in accordance with feeding of a tape in a direction which is changed over to an opposite direction when said tape is changed over from forward feed to reverse feed and from reverse feed to forward feed, for example, a first counter which performs addition in forward feed of the tape and subtraction in reverse feed of the tape, a second rotating means which rotates in accordance with feeding of a tape in a direction which is changed over to an opposite direction when said tape is changed over from forward feed to reverse feed and from reverse feed to forward feed, for example, a second counter which performs subtraction in forward feed of the tape and addition in reverse feed of the tape, a first resetting means which resets said first rotating means to a specified position independently of said second rotating means, a second resetting means which resets said second rotating means to a specified position independently of said first rotating means, a first signal generating means which generates a signal when said first rotating means rotates exceeding the resetting position in any direction, a second signal generating means which generates a signal when said second rotating means rotates exceeding the resetting position in any direction, a tape feed direction control circuit which sets alternatively an operation mode for which a forward feed signal to perform forward feed of the tape is generated and an operation mode for which a reverse feed signal to perform reverse feed of the tape is generated, a tape speed control lcircuit which sets alternatively a fast feed mode to generate a fast feed signal for fast feed of a tape and a reverse feed mode to generate a reverse feed signal for reverse feed of a tape, a fast forward switch which triggers said tape feed direction control circuit so that said tape feed direction control circuit comes in a forward feed mode and triggers said tape speed control circuit so that said tape speed control circuit comes in a fast feed mode, a fast reverse switch which triggers said tape feed direction control circuit so that said tape feed direction control circuit comes in a reverse feed mode and triggers said tape speed control circuit so that said tape speed control circuit comes in a fast feed mode, a coupling means which transmits a signal from said first signal generating means to said tape feed direction control circuit to change over said tape feed direction control circuit from a reverse feed mode to a forward feed mode and transmits a signal from said second signal generating means to said tape feed direction control circuit to change over said tape feed direction control circuit from a forward feed mode to a reverse feed mode, a fast feed direction memory circuit which memorizes the latest operations of said fast forward switch and fast reverse switch and controls said coupling means to prevent said coupling means from transmitting the signal of said first signal generating means to said tape feed direction control circuit when the operation of the fast forward switch is memorized and from transmitting the signal of said second signal generating means to said tape feed direction control circuit when the operation of the fast reverse switch is memorized, a memorizing means which is triggered each time said coupling means transmits signals from both said signal generating means to said tape feed direction control circuit, and a tape stopping means which operates to stop the tape when said memorizing means is triggered two times continuously with the signal from one of said signal generating means.

BRIEF DESCRIPTION OF DRAWINGS

The present invention is illustrated in detail by the accompanying drawings whereon.

DETAILED DESCRIPTION

Figure 1:
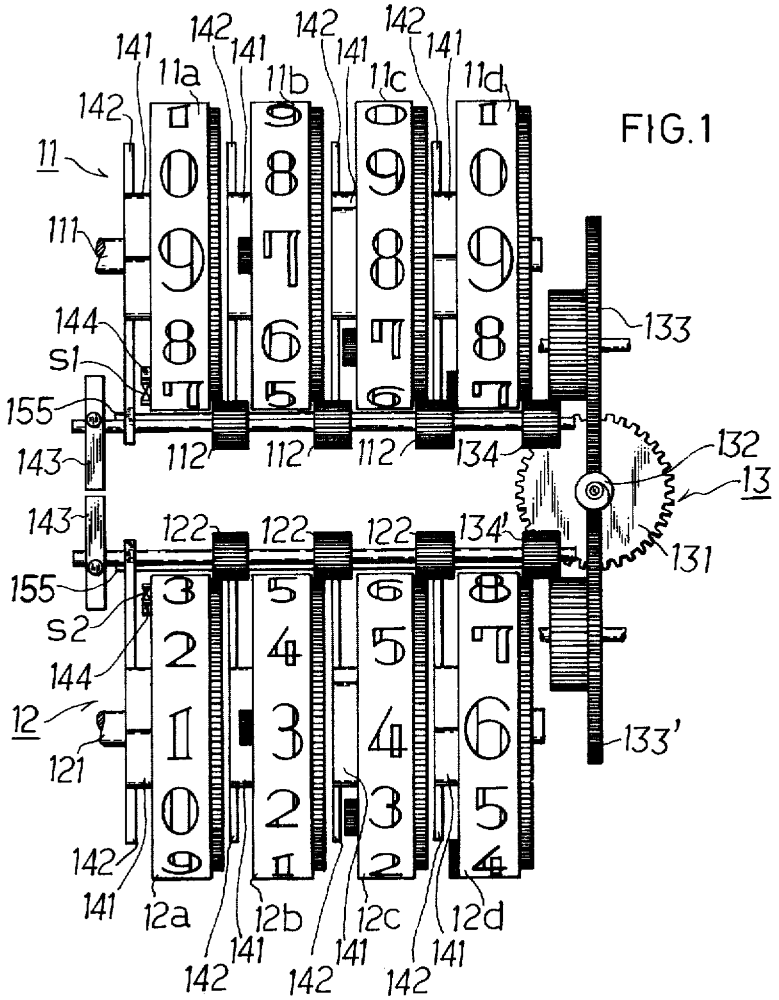
FIG. 1 is a plan view illustrating the first and second rotating means employed in the apparatus according to the present invention as an embodiment in which both of the rotating means are the counters having respectively a resetting means and a switching means.

Referring to FIG. 1, there are shown first counter 11 and second counter 12 which are employed as the means which rotate as the tape is fed.

1st counter 11 is adapted to be provided with a plural number of rotary digit wheels 11*a*, 11*b*, 11*c* and 11*d* which are marked or engraved with numerals 0 to 9 on their peripheral surfaces and are mounted rotatably on shaft 111 on which said digit wheels are coupled with the digit forward-carrying means such as carry gears 112, thereby the digit wheel at a higher digital position advances by one count each time any digit wheel lower next to said digit wheel turns fully once.

2nd counter 12, as said 1st counter, is provided with rotary digit wheels 12*a*, 12*b*, 12*c* and 12*d* which are mounted rotatably on shaft 121 and are coupled with the digit forward-carrying means such as carry gears 122.

Said both counters 11 and 12 are designed so that the rotation of the reel shaft (not shown) is transmitted to the rotary digit wheels of the both counters by transmitting means 13 and these counters rotate individually in opposite directions when the tape is fed, that is, one counter carries out addition and the other does subtraction.

Said transmitting means comprises worm gear 132 connected to pulley 131, a pair of gears 133 and 133' which engage with said worm gears and drive gears 134 and 134' which engage with said gears and are arranged with said carry gears 112 and 122.

Said digit wheels are provided with heart-shaped resetting cams 141 at their lateral sides and the operating means such as resetting levers 142 are provided oppositely on said cams.

The resetting means consisting of these cams and levers rotates to reset the rotary digit wheels so that said digit wheels indicate zero (0) simultaneously. In other words, the resetting means are designed so that the counters are reset to zero. When resetting buttons 143 which actuate simultaneously resetting levers 142 are depressed, said carry gears 112 and 122 and drive gears 134 and 134' are rotated around pivotal shafts 155 of said levers 142 and disengaged from the digit wheels and the digit wheels are reset to the zero indicating position.

Said resetting means are provided on both counters 11 and 12 respectively to allow said both counters 11 and 12 to be reset individually.

Figure 2:
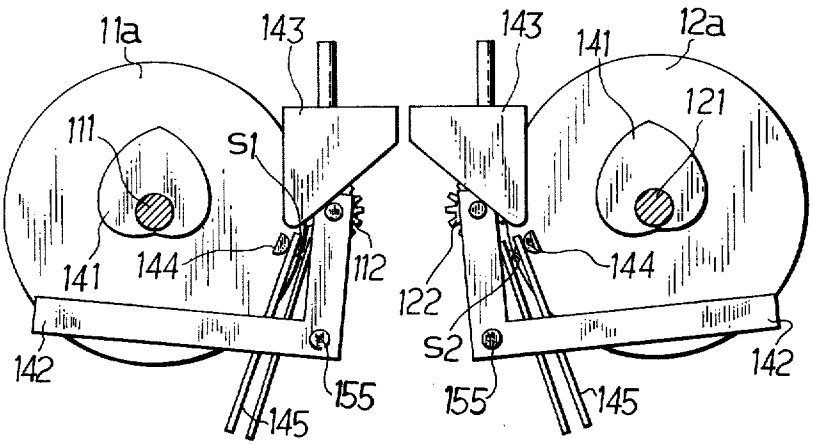
FIG. 2 is a left-hand side view of said first and second rotating means shown in FIG. 1.

Most significant digit (MSD) wheels 11a and 12a of said both counters 11 and 12 are provided with switching means S1 and S2 which operate when all these digit wheels indicate 9. Said switching means S1 and S2 are provided to generate the signal when MSD wheels rotate from/to the resetting positions to/from the 9-indicating positions in their respective rotation. Switching means can be freely adapted so that, for example, projection 144 which is provided at the specified position of digit wheel 11a as shown in FIG. 2 pushes and actuates contact plate 145 when said digit wheel 11*a* indicates 9. Otherwise said switching means can be constructed by fixing a magnet at the side of said digit wheel so that the contact plate of the switch is actuated by means of an attracting force of said magnet or by providing a non-contact switch using a magneto-resistance effect device.

Hereupon, during forward feed of a tape, the 1st counter indicates the value of addition and the 2nd counter indicates the value of subtraction while during reverse feed of a tape, the 1st counter indicates the value of subtraction and the 2nd counter indicates the value of addition.

Figure 3:
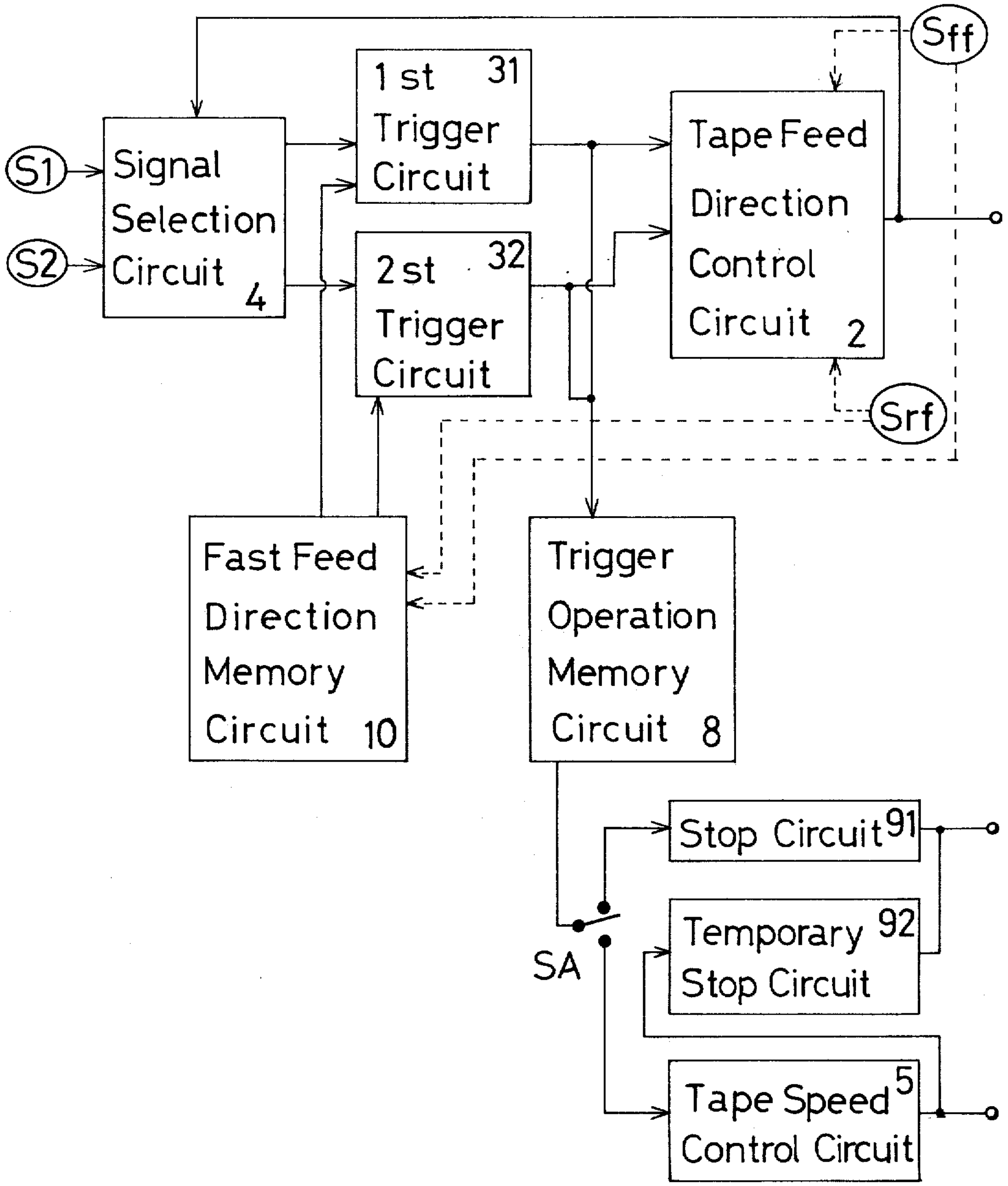
FIG. 3 is a block diagram illustrating the principle of the apparatus of the present invention, FIGS. 4*a* and 4*b* jointly show a circuit of an embodiment of the present invention when the upper end of FIG. 4*b* is attached to the lower end of FIG. 4*a*, FIGS. 5*a* to 5*d* show the relationship between the waveforms of the signals in the circuits shown in FIGS. 4*a* and 4*b* and the values indicated on the counters along with the lapse of time.

1st switching means S1 and 2nd switching means S2 are connected to the circuit section shown in FIG. 3 Principle Diagram.

This circuit section actuates selectively the control section such as the relay (not shown) provided at the drive mechanism of the tape recorder through operation of said both switching means S1 and S2, changes over or stops feeding of the tape in accordance with the indication of the counter and repeats the reproduction of a record in a certain part of the tape.

This is described in the following.

A tape feed direction control circuit 2 generates alternatively the forward feed signal or the reverse feed signal which determines the feed direction of the tape and is adapted to generate the forward feed signal when the fast forward switch Sff is operated and the reverse feed signal when the fast reverse switch Srf is operated.

Said fast forward switch Sff is used for fast forward feed and said fast reverse switch Srf for "rewind".

Said direction control circuit 2 is connected to 1st trigger circuit 31 and 2nd trigger circuit 32, in addition to said both switches.

1st trigger circuit 31 triggers a tape feed direction control circuit 2 to change tape feed direction control circuit 2 from the state where it is generating the reverse feed signal to the state to generate the forward feed signal while 2nd trigger circuit 32 triggers tape feed direction control circuit 2 to change tape feed direction control circuit 2 from the state where it is generating the forward feed signal to the state to generate the reverse feed signal.

Said 1st trigger circuit operates with the output signal of 1st switching means S1 and said 2nd trigger circuit operates with the output signal of 2nd switching means S2. Signal selection circuit 4 is connected between trigger circuits 31 and 32 and switching means S1 and S2.

Signal selection circuit 4 transmits alternatively one of the signals of both switching means S1 and S2, that is, the signal generated when the counter counts through "9999" to a corresponding trigger circuit and does not transmit the signal generated when the counter counts through "9000".

1st switching means S1 turns on when the 1st counter counts through 9000 and turns off when said 1st counter counts through 9999 during forward feed.

On the other hand, the 1st switching means turns on when the 1st counter counts through 9999 and turns off when said 1st counter counts through 9000 during reverse feed.

2nd switching means S2 turns on when the 2nd counter counts through 9999 and turns off when said 2nd counter counts through 9000 during forward feed.

On the other hand, 2nd switching means S2 turns on when the 1st counter counts through 9999 and turns off when said 1st counter counts through 9000 during reverse feed.

Accordingly, signal selection circuit 4 is adapted so that it transmits the turning-off signal of 1st switching means S1 to 1st trigger circuit 31 and the turning-on signal of the 2nd switching means S2 to 2nd trigger circuit 32 during forward feed while the signal selection circuit transmits the turning-on signal of the 1st switching means S1 to the first trigger circuit and the turning-off signal of the 2nd switching means to 2nd trigger circuit 32 during reverse feed.

Since the signal of the switching means when the counters count through 9999 differs with the feed direction of the tape, said signal selection circuit is controlled with the output signal of the tape feed direction control circuit 2.

Stop circuit 91 generates the stop signal to stop feeding of a tape when the specified signal is input; speed control circuit 5 generates alternatively the fast feed signal to perform fast feeding of the tape for fast forward feed or rewinding or the slow feed signal to perform slow feeding of the tape for playing or recording; and temporary stop circuit 92 generates a temporary stop signal for the specified period of time when the signal generated by speed control circuit 5 is changed from the fast feed signal to the slow feed signal, that is, in other words, the tape speed changes from fast feed to slow feed. Trigger operation memory circuit 8 memorizes the trigger operations of 1st trigger circuit 31 and 2nd trigger circuit 32 and supplies to said stop circuit 91 or speed control circuit 5 through the subsequent second trigger operation such a signal causing said stop circuit 91 to generate a stop signal or speed control circuit 5 to generate a fast feed signal.

Change-over switch SA is operated to supply alternatively the output signal from said trigger operation memory circuit to temporary stop circuit 92 or speed control circuit 5.

Fast feed direction memory circuit 10 memorizes the latest operation of fast forward switch Sff or fast reverse switch Srf and performs controlling so that 1st trigger circuit 31 cannot operate in case that the operation of fast forward switch Sff is memorized and 2nd trigger circuit 32 cannot operate in case that operation of the fast reverse switch Srf is memorized.

Accordingly, for example, when fast forward switch Sff is operated and the fast forward feed is performed, only the changing-over operation from forward feed to reverse feed is possible with operation of 2nd trigger circuit 32 and therefore the tape is not changed over again to the forward feed since the 1st trigger circuit does not operate even when the signal from 1st switching means S1 is applied to the 1st trigger circuit.

Figure 4A:
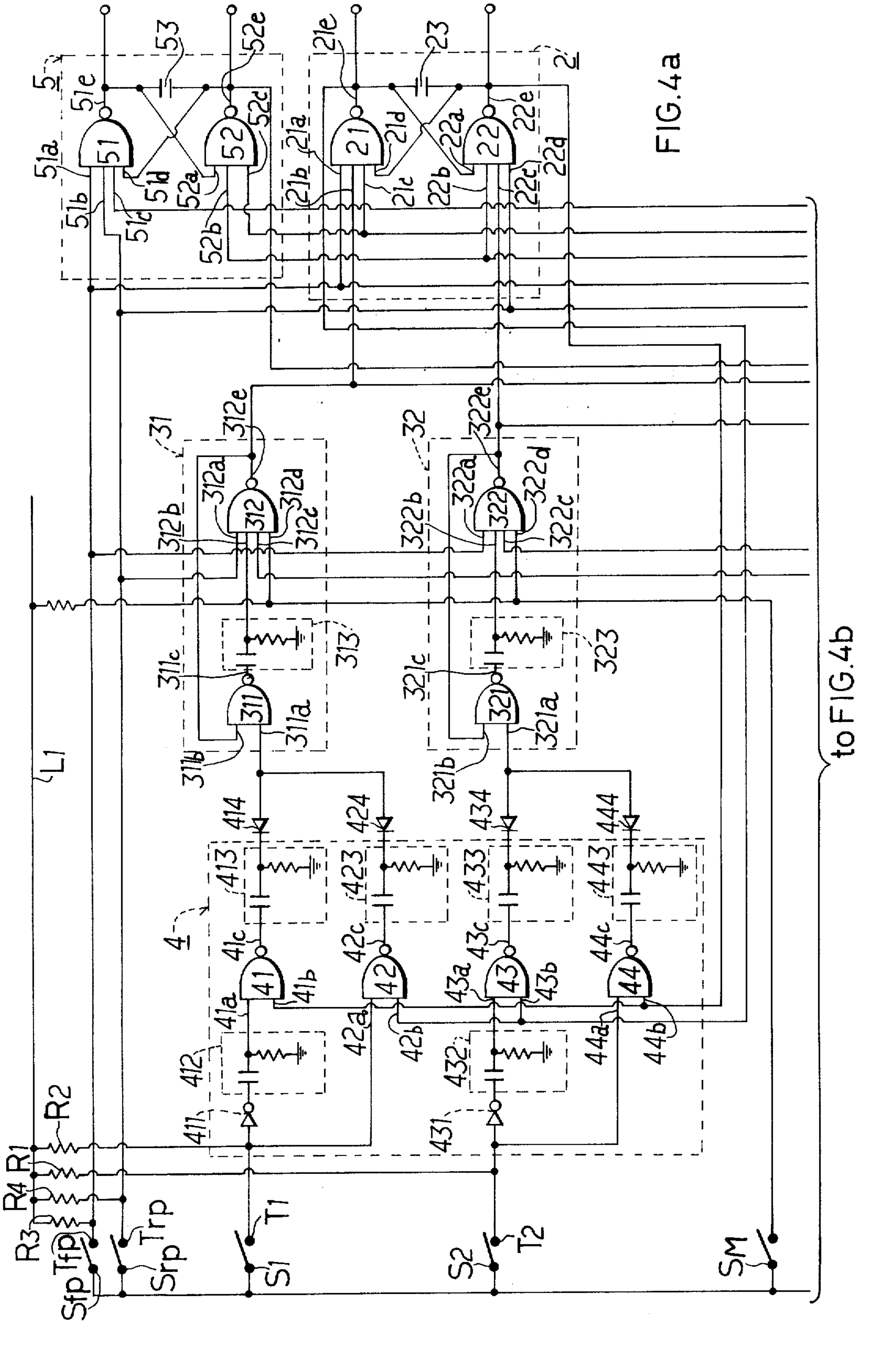
Figure 4B:
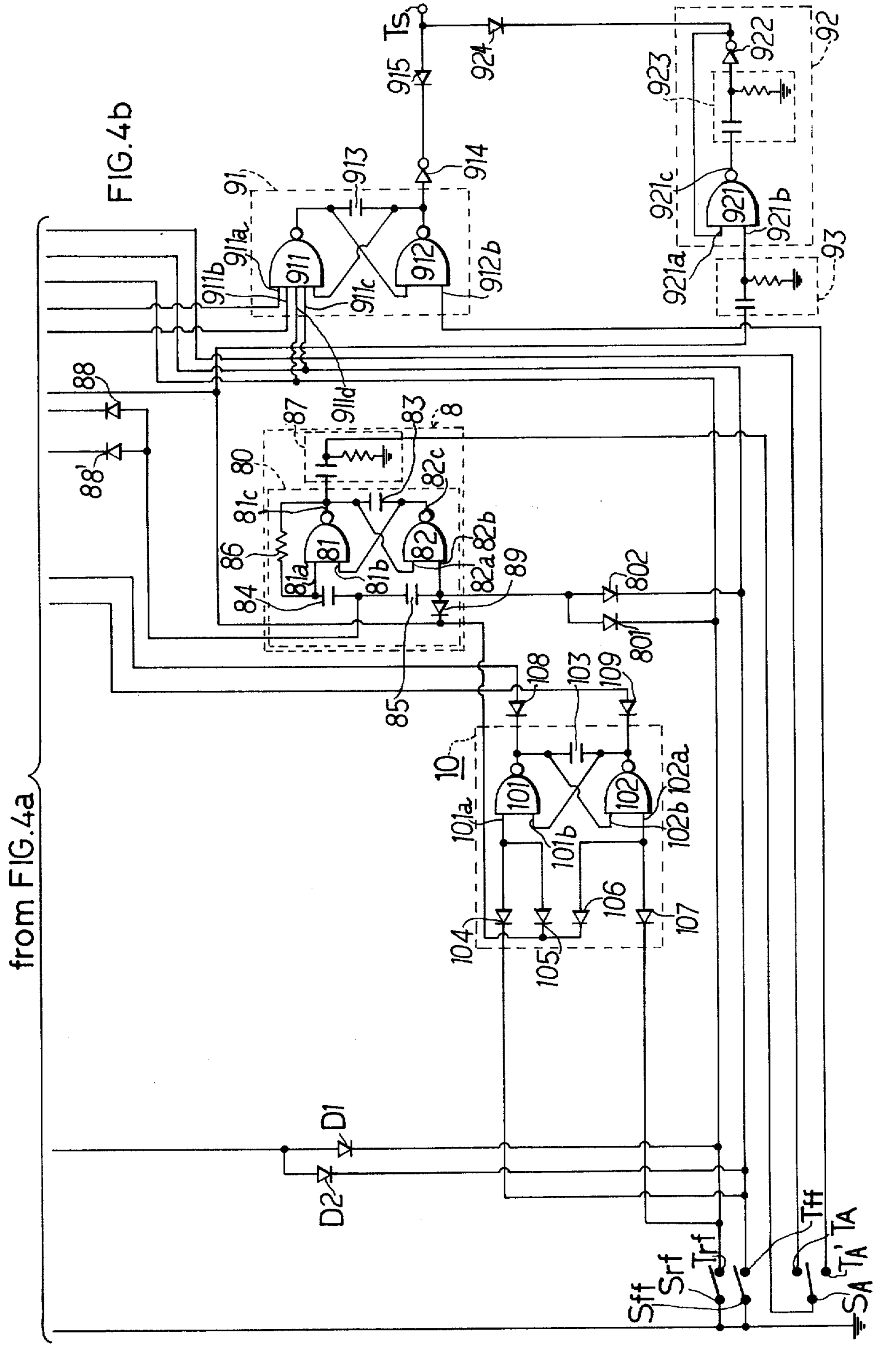

FIGS. 4*a* and 4*b* show an embodiment of the circuit described above.

1st switching means S1 and 2nd switching means S2 are designed to ground switch terminals T1 and T2 while the MSD wheels of the counters indicate 9 and said switch terminals T1 and T2 are connected respectively to the power supply line L1 through load resistors R1 and R2.

accordingly, both switching means S1 and S2 produce the low level output (hereinafter referred to as L output) while the counters indicate from 9000 to 9999 and the high level output (hereinafter referred to as H output) in other cases.

Slow forward switch Sfp, the slow reverse switch Srp, the fast forward switch Sff and the fast reverse switch Srf are operated respectively to ground switch terminals Tfp, Trp, Tff and Trf, thus producing the L output.

Signal selection circuit 4 comprises a pair of inverters 411 and 431, two pairs of 2-input terminal type NAND gates 41, 42, 43 and 44, differentiation circuits 413, 423, 433 and 443 and differentiation circuits 412 and 432.

Inverter 411 and differentiation circuit 412 are connected in series between switch terminal T1 of 1st switching means S1 and 1st input terminal 41*a* of NAND gate 41 while inverter 431 and differentiation circuit 432 are connected in series between switch terminal T2 of 2nd switching means S2 and 1st input terminal 43*a* of NAND gate 43. Furthermore, 1st input terminal 42*a* of NAND gate 42 is directly connected to switch terminal T1 of 1st switching means S1 and 1st input terminal 44*a* of NAND gate 44 is directly connected to switch terminal T2 of 2nd switching means S2.

Differentiation circuits 413, 423, 433 and 443 are connected respectively to output terminals 41*c*, 42*c*, 43*c* and 44*c* of NAND gates 41, 42, 43 and 44.

1st trigger circuit 31 form a mono-stable multivibrator consisting of a pair of the NAND gates 311 and 312 and differentiation circuit 313.

In other words, the 1st trigger circuit is formed by connecting 2nd input terminal 311*b* of NAND gate 311 to output terminal 312 of NAND gate 312 and connecting differentiation circuit 313 between output terminal 311*c* of NAND gate 311 and 2nd input terminal 312*b* of NAND gate 312.

Said 1st trigger circuit generates the L pulse output from output terminal 312*e* of NAND gate 312 when the L signal is input into input terminal 311*a* of NAND gate 311.

This is the same with the 2nd trigger circuit 32.

The output side of differentiation circuits 413 and 423 in said signal selection circuit 4 are connected respectively to 1st input terminal 311*a* of NAND gate 311 in the 1st trigger circuit through diodes 414 and 424 while the output sides of differentiation circuits 433 and 443 are connected respectively to 1st input terminal 321*a* of NAND gate 321 in the 2nd trigger circuit through diodes 434 and 444.

Said diodes 414, 424, 434 and 444 are connected in a forward direction from respective trigger circuits toward the signal selection circuit.

Tape feed direction control circuit 2 forms a flip-flop circuit comprising a pair of NAND gate 21 and 22 and capacitor 23 thereby 4th input terminal 21*d* of NAND gate 21 is connected to output terminal 22*e* of NAND gate 22, 1st input terminal 22*a* of NAND gate 22 is connected to output terminal of NAND gate 21 and said capacitor 23 is connected between output terminals 21*e* and 22*e* of both NAND gates.

Output terminal 312*e* of NAND gate 312 of said 1st trigger circuit is connected to 2nd input terminal 21*b* of NAND gate 21 in said tape feed direction control circuit and output terminal 322*e* of NAND gate 322 of the 2nd trigger circuit to 3rd input terminal 22*c* of NAND gate 22 in said tape feed direction control circuit.

Moreover, 1st input terminal 21*a* of the NAND gate 21 of said tape feed direction control circuit is connected to switch terminal Tfp of slow forward switch Sfp and 3rd input terminal 21*c* is connected to switch terminal Tff of fast forward switch Sff while 2nd input terminal 22*b* of NAND gate 22 of said tape feed direction control circuit 2 is connected to switch terminal Trf of fast reverse switch Srf and 4th input terminal 22*d* is connected to switch terminal Trp of slow reverse switch Srp.

Speed control circuit 5 as said tape feed direction control circuit forms a flip-flop circuit comprising a pair of NAND gates 51 and 52 and capacitor 53, thereby 1st input terminal 51*a* of NAND gate 51 is connected to switch terminal Tfp of slow forward switch Sfp and 2nd input terminal 51*b* to switch terminal Trp of slow reverse switch Srp while 2nd input terminal 52*b* of NAND gate 52 is connected to switch terminal Trf of fast reverse switch Srf and 3rd input terminal 52*c* to switch terminal Tff of fast forward switch Sff.

Trigger operation memory circuit 8 comprises T flip-flop circuit 80 consisting of a pair of NAND gates 81 and 82, capacitors 83, 84 and 85 and resistor 86 and differentiation circuit 87.

T flip-flop circuit 80 is formed by respectively connecting 2nd input terminal 81*b* of NAND gate 81 to output terminal 82*c* of NAND gate 82, 1st input terminal 82*a* of NAND gate 82 to output terminal 81*c* of NAND gate 81 and capacitor 83 between output terminals 81*c* and 82*c* of both NAND gates 81 and 82, and connecting in series a pair of capacitors 84 and 85 between 1st input terminal 81*a* of NAND gate 81 and 2nd input terminal 82*b* of NAND gate 82 and resistor 86 between 1st input terminal 81*a* and output terminal 81*c* of NAND gate 81.

The differentiation circuit 87 is connected to output terminal 81*c* of NAND gate of T flip-flop circuit 80.

In said trigger operation memory circuit, the intermediate connecting point of capacitors 84 and 85 which are series-connected is connected to output terminal 312*e* of NAND gate 312 of 1st trigger circuit 31 and output terminal 322*e* of NAND gate 322 of 2nd trigger circuit 32 through diodes 88 and 88′ and 2nd input terminal 82*b* of NAND gate 82 is connected to output terminal 52*e* of NAND gate 52 of speed control circuit 5 through diode 89.

Diodes 88, 88′ and 89 are connected in a forward direction from trigger operation memory circuit 8 toward the both trigger circuits or the speed control circuit.

The output side of differentiation circuit 87 is connected to change-over switch SA.

Stop circuit 91 forms a flip-flop circuit comprising a pair of NAND gates 911 and 912 and capacitor 913.

Said stop circuit is such that contact terminals Tfp, Trp, Tff and Trf of switches Sfp, Srp, Sff and Srf and connected to input terminals 911*a*, 911*b*, 911*c* and 911*d* of NAND gate 911 and one contact terminal TA′ of change-over switch SA is connected to input terminal 912*b* of other NAND gate 912.

The output terminal 912*c* of NAND gate 912 is connected to stop output terminal TS through inverter 914 and diode 915.

Contact terminal TA of said change-over switch SA is connected to 3rd input terminal 51*c* of the NAND gate 51 of speed control circuit 5.

Temporary stop circuit 92 forms the monostable multivibrator and comprises the NAND gate 921, inverter 922 and differentiation circuit 923 connected between input terminal 921*c* of NAND gate 921 and the input side of inverter 922, and the output side of inverter 922 is connected so that the output is fed back to 1st input terminal 921*a* of NAND gate 921.

The output terminal 52*e* of the NAND gate 52 of said speed control circuit 5 is connected to 2nd input terminal 921*b* of NAND gate 921 of temporary stop circuit 92 through differentiation circuit 93 while the output side of inverter 922 of said temporary stop circuit is connected to stop output terminal TS through diode 924.

Temporary stop circuit 92 operates when the signal which lowers from H to L is input from speed control circuit 5 and outputs the L signal for the time which is set by the capacitor and the resistor which comprise differentiation circuit 923.

That is to say, the temporary stop signal is generated for the specified time.

Fast feed direction memory circuit 10 forms a flip-flop circuit consisting of a pair of NAND gates 101 and 102 and capacitor 103, thereby fast forward switch Sff is connected to input terminal 101*a* of NAND gate 101 through diode 104, fast reverse switch Srf is connected to input terminal 102*a* of NAND gate 102 through diode 107 and these input terminals 101*a* and 102*a* are connected to output terminal 52*e* of NAND gate 52 of speed control circuit 5 through diode 106.

The output terminal of NAND gate 101 is connected to 3rd input terminal 322*c* of NAND gate 322 of 2nd trigger circuit 32 through diode 108 and the output terminal of NAND gate 102 is connected to 3rd input terminal 312*c* of NAND gate 312 of 1st trigger circuit 31 through diode 109.

Hereupon, the following describes the operations of the circuits in sequence.

When fast forward switch Sff is operated, the L input is applied from switch terminal Tff to 3rd input terminal 21*c* of NAND gate 21 of tape feed direction control circuit 2 and 3rd input terminal 52*c* of NAND gate 52 of speed control circuit 5.

With the above operation, tape feed direction control circuit 2 is triggered so that the output of NAND gate 21 becomes H and simultaneously the output of NAND gate 22 becomes L.

Such a signal as described above corresponds to said forward feed signal. In other words, the tape is forwarded by this output.

On the other hand, speed control circuit 5 is triggered so that output terminal 51*e* of NAND gate 51 becomes L and output terminal 52*e* of NAND gate 52 becomes H.

Such a signal as described above corresponds to said fast feed signal and the tape is fast fed by this output signal.

Thus, the fast forward feed is set.

When fast forward switch Sff is operated as described above, the L input is applied to the input terminal of NAND gate 101 of fast feed direction memory circuit 10 and therefore said fast feed direction memory circuit is triggered in a direction where the output of NAND gate 102 becomes L and the output of NAND gate 101 becomes H.

Since the L output of NAND gate 102 is applied to 3rd input terminal 312*c* of NAND gate 312 of 1st trigger circuit 31 through diode 109, said NAND gate 312 cannot operate.

In other words, the output of NAND gate 312 is locked at H. That is to say, when the tape feed is started from fast forward feed, only 2nd trigger circuit 32 can operate.

In slow feed, the outputs of both NAND gates 101 and 102 become H and accordingly both trigger circuits 31 and 32 are enabled to operate since the output of output terminal 52*e* of NAND gate 52 of speed control circuit 5 becomes L and this output is input into NAND gates 101 and 102 of fast feed direction memory circuit 10 through diodes 105 and 106.

When fast reverse switch Srf is operated, the L input is applied from switch terminal Trf to 2nd input terminal 22*b* of NAND gate 22 of tape feed direction control circuit 2 and to 2nd input terminal 52*b* of the NAND gate 52 of speed control circuit 5.

With this operation, tape feed direction control circuit 2 is triggered in a direction where the output of NAND gate 22 becomes H and the output of NAND gate 21 becomes L.

Such the output as the above is said reverse feed signal and the feed direction of the tape is set to reverse.

Speed control circuit 5 is triggered in a direction where the output of NAND gate 51 becomes L as in case that said fast forward switch Sff is operated. Thus, fast reverse feed, that is, "rewind" is set.

Since the L input is applied to the input terminal of NAND gate 102 of fast feed direction memory circuit 10 when fast reverse switch Srf is operated, said fast feed direction memory circuit is triggered in a direction where the output of NAND gate 101 becomes L and the output of NAND gate 102 becomes H.

The L output of NAND gate 101 is applied to 3rd input terminal 322*c* of NAND gate 322 of 2nd trigger circuit 32 through diode 108 and therefore NAND gate 32 cannot operate.

That is to say, the output of NAND gate 322 is locked at H. When the tape feed is started from fast reverse feed, only 1st trigger circuit 31 can operate.

In the forward feed, since the output of NAND gate 22 of tape feed direction control circuit 2 is L and is input into NAND gates 41 and 44 of signal selection circuit 4, these NAND gates cannot operate. Only NAND gates 42, 43 are enabled to operate.

In reverse feed, the output of NAND gate 21 is L and is input into NAND gates 42 and 43 of signal selection circuit 4 and therefore these NAND gates 42 and 43 cannot operate.

Figure 5A:
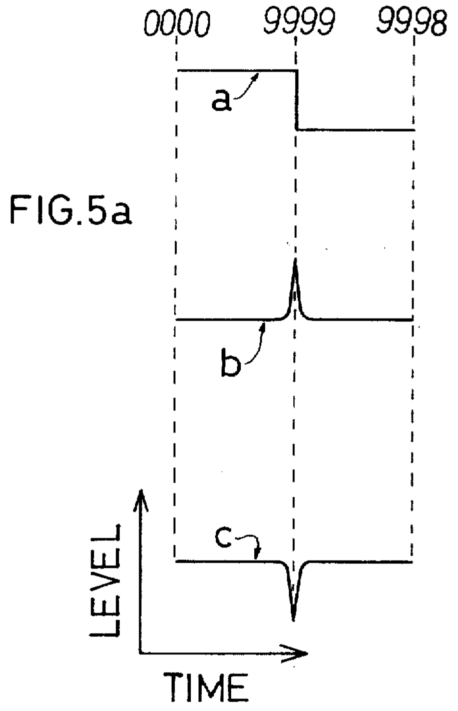

Hereupon, since the 2nd counter carries out subtraction in forward feed, 2nd switching means S2 turns on when the counter counts through 0000 to 9999 and generates an output which falls down from H to L as shown with line a in FIG. 5*a*.

This output is reversed by inverter 431, differentiated by differentiation circuit 432 and input into NAND gate 43 as the pulse shown with line *b* in FIG. 5*a*. NAND gate 43 is actuated by this pulse and generates the L output shown with line *c* in FIG. 5*a*.

This pulse is input into 2nd trigger circuit 32 to actuate said 2nd trigger circuit through diode 434 after having been differentiated by differentiation circuit 433.

Figure 5C:
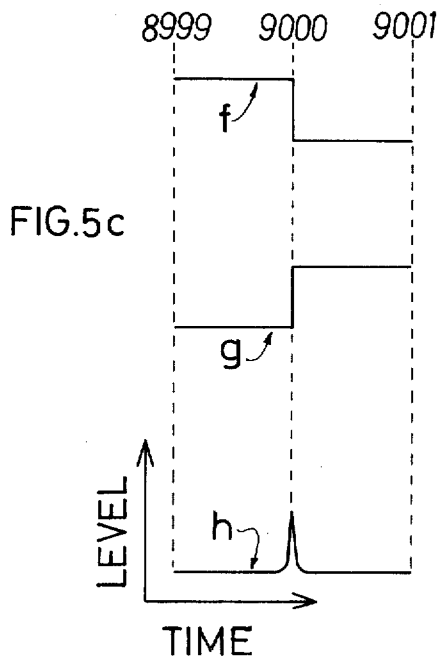
Figure 5B:
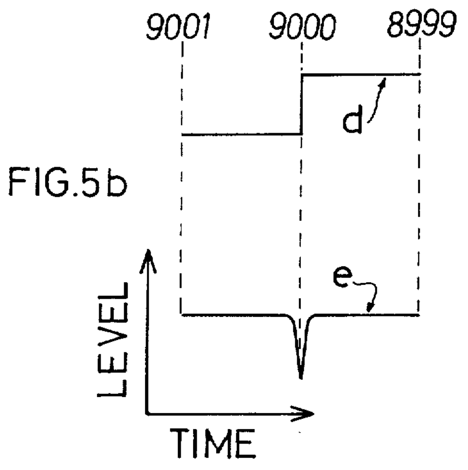

On the other hand, in forward feed, 2nd switching means S2 turns off when the 2nd counter counts through 9000 to 8999 and generates an output which rises from L to H shown with line d in FIG. 5*b*.

This output is reversed by inverter 431, differentiated by differentiation circuit 432 and input into NAND gate 43 as the pulse shown with line *e* in FIG. 5*b*. Since this pulse is negative, the output of NAND gate 43 becomes H and 2nd trigger circuit 32 cannot be operated.

As the 2nd counter performs addition in reverse feed, 2nd switching means S2 turns on when the 2nd counter counts through 8999 to 9000 and generates an output which falls down from H to L as shown with line *f* in FIG. 5*c*.

This output is directly input into NAND gate 44 and the NAND gate generates an output which rises from L to H as shown with line *g* in FIG. 5*c*.

This output is differentiated by differentiation circuit 443 and a pulse shown with line *h* in FIG. 5*c* is obtained. Since this pulse is a rise pulse, 2nd trigger circuit 32 does not operate.

Figure 5D:
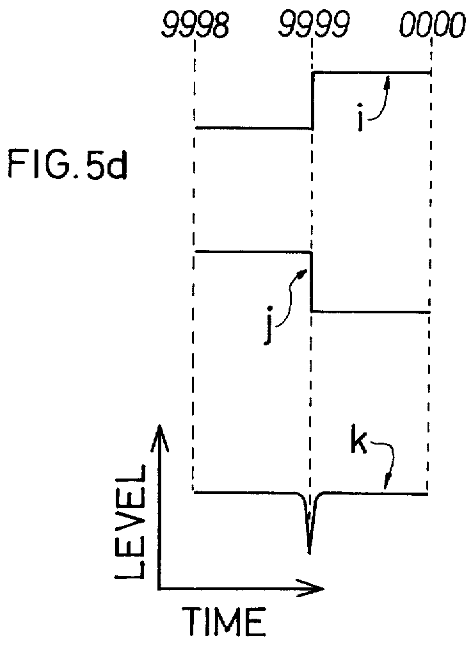

On the other hand, 2nd switching means S2 turns off when the 2nd counter counts through 9999 to 0000 in reverse feed and generates an output which rises from L to H as shown with line *i* in FIG. 5*d*.

This output is input directly into NAND gate 44 which generates an output which falls down from H to L as shown with line *j* in FIG. 5*d*.

This output is differentiated by differentiation circuit 443 and a pulse shown with line *k* in FIG. 5*d* is obtained. This pulse is input into 2nd trigger circuit 32 to actuate it through diode 444.

Thus, the operation signal from 2nd switching means S2 is applied to 2nd trigger circuit 32 through NAND gate 43 at the timing when the counter counts through 9999 in forward feed while this signal is applied to 2nd trigger circuit 32 through NAND gate 44 when the counter counts through 9999 in reverse feed.

On the other hand, since the 1st counter is in reverse relation to the 2nd counter, the operation signal from 1st switching means S1 is applied to 1st trigger circuit 31 through NAND gate 42 when the 1st counter counts through 9999 in forward feed and is applied to 1st trigger circuit 31 through NAND gate 41 when the 1st counter counts through 9999 in reverse feed.

The following describes the operation commenced by operating fast reverse switch Srf while referring to Table 1.

1st trigger circuit 31 can operate and 2nd trigger circuit 32 cannot operate as described in the following; accordingly, even though the signal from 2nd switching means S2 is input to 2nd trigger circuit 32, the 2nd trigger circuit does not operate. In other words, the 1st switching means only is effective.

The 1st counter performs subtraction in fast reverse feed and counts through 0000 to 9999. In this case, 1st trigger circuit 31 operates with the signal which is input into the 1st trigger circuit through NAND gate 41 by turning on of 1st switching means S1 and generates the L pulse in output terminal 312*e* of NAND gate 312.

This L pulse is input into 2nd input terminal 21*b* of NAND gate 21 of tape feed direction control circuit 2 and the tape feed direction control circuit is triggered so that the output of NAND gate 22 becomes L.

In other words, the tape feed direction control circuit comes in the state to generate the forward feed signal, and the tape feed is changed over to the fast forward feed.

H and is inverted by inverter 914 and the inverted output is contrarily changed from H to L.

In other words, the output of stop circuit 91 changes from H to L.

This signal corresponds to said stop signal by which the tape being fed is stopped.

On the other hand, when change-over switch SA is set to the temporary stop side, that is, the contact terminal TA side, the differential output of trigger operation memory circuit 8 is input into 3rd input terminal 51*c* of NAND gate 51 of tape speed control circuit 5.

Accordingly, in forward feed after inversion, said

TABLE 1

| Tape feed mode | Fast reverse (Rewind) | Fast forward | Stop: Temporary stop | Slow forward (play) |
|---|---|---|---|---|
| Indication of 1st counter | 9999 · · · 0000 | 9976 · · · · · | 9999 / 9999 | · · · |

Hereupon, since there is a certain time lag due to mechanical inertia until the tape feed is changed over actually after the counter has counted through 9999, the 1st counter counts up to, for example, 9976 and the forward feed begins from 9976 as shown in Table 1. In the forward feed, the 1st counter performs addition and 1st switching means S1 turns off when the 1st counter counts through 9999 to 0000.

In this case, NAND gate 42 is ready to operate and therefore the signal generated by turning off operation of the 1st switching means is applied to 1st trigger circuit 31 and the L pulse is generated by 1st trigger circuit 31.

This pulse is applied to 2nd input terminal 21*b* of NAND gate 21 of the tape feed direction control circuit to cause the tape feed direction control circuit to be triggered so that the output of NAND gate 22 becomes L, however, the state of the tape feed direction control circuit does not change since said tape feed direction control circuit is already triggered in a stage where it is already changed over to the forward feed.

In other words, the tape feed direction control circuit continues generation of the forward feed signal.

Since the output side of 1st trigger circuit 31 is connected to trigger operation memory circuit 8, the trigger operation memory circuit is triggered every time 1st trigger circuit 31 generates the L pulse. In other words, output terminal 81*c* of NAND gate 81 is triggered to become H by operation of 1st trigger circuit 31 when the 1st counter first counts through 9999 in reverse feed and output terminal 81*c* is triggered to become L by operation of the 1st trigger circuit when the 1st counter counts through 9999 in forward feed after reversing of the tape.

When change-over switch SA is set to the stop side, that is, contact terminal TA' side, the differential output of trigger operation memory circuit 8 is input to NAND gate 912 of stop circuit 91.

Accordingly, in forward feed after conversion of the counter, stop circuit 91 is triggered by the output of trigger operation memory circuit 8, that is, the differential output of the fall-down signal of NAND gate 81 when the 1st counter counts through 9999 so that the output of NAND gate 911 becomes L.

The output of NAND gate 912 is changed from L to speed control circuit is triggered by the output of trigger operation memory circuit 8, that is, the differential output of the fall-down signal of NAND gate 81 when the 1st counter counts through 9999 so that the output of NAND gate 52 becomes L and the slow feed mode is obtained.

When the output of NAND gate 52 changes from H to L, this output actuates temporary stop circuit 92. That is to say, the temporary stop circuit is triggered by said output and the L signal is generated from the output terminal of inverter 922 for a specified duration of time.

This signal output is the temporary output signal which stops temporarily the tape being fed.

After expiration of this signal output, the slow feed is started by said tape speed control circuit.

As described above, when change-over switch SA is set to the contact terminal TA' side, the fast reverse feed is changed over to the fast forward feed after the 1st counter counts through 9999 and the tape stops during forward feed after the 1st counter counts through 9999.

When the change-over switch SA is connected to the contact terminal TA side, the operation is inverted from fast reverse feed to fast forward feed after the 1st counter counts through 9999 and is temporarily stopped during forward feed when the 1st counter counts through 9999. Then a slow forward feed, that is, "forward play" starts.

The above describes the operation which is started from fast reverse feed, that is, rewinding by operating fast reverse switch Srf, and the operation starting from fast forward feed can be considered in the same manner.

In this case, the 1st trigger circuit 31 cannot operate and only 2nd trigger circuit 32 can operate and therefore the signal of 2nd switching means S2 is effective.

In fast forward feed, the output signal obtained from turning on of 2nd switching means S2 when the 2nd counter counts through 0000 to 9999 actuates 2nd trigger circuit 32 through NAND gate 43, and the tape operation is changed over to fast reverse feed and the output of NAND gate 81 of trigger operation memory circuit 8 is triggered to become H.

After changing the tape feed direction, the output signal obtained from turning off of the 2nd switching means S2 when the 2nd counter counts through 9999 to 0000 actuates 2nd trigger circuit 32 through NAND gate 44. In this case, the feed direction does not change but the output of NAND gate 81 of said trigger operation memory circuit 8 is triggered to become L.

Thus, the differential waveform of the output of NAND gate 81 which changes from H to L is input into stop circuit 91 or tape speed control circuit 5 through change-over switch SA. Accordingly, the tape operation is stopped or comes in the slow reverse feed after being temporarily stopped.

When the tape operation is changed to slow feed as described above, the output of NAND gate 52 of tape speed control circuit 5 becomes L and is input into the input terminal of NAND gate 82 of trigger operation memory circuit 8 through diode 89 and accordingly the output of NAND gate 81 of the trigger operation memory circuit is locked at L. In other words, the trigger operation memory circuit cannot operate.

On the other hand, the L output of NAND gate 52 is applied to the input terminals of NAND gate 101 and 102 of fast feed direction memory circuit 10 through diodes 105 and 106 and the outputs of both NAND gates 101 and 102 become H thereby NAND gates 312 and 322 both trigger circuits 31 and 32 can operate. Accordingly, the signal outputs of 1st and 2nd switching means S1 and S2 become effective.

For example, when the 2nd counter counts through 9999 in subtraction during slow forward fast, 2nd trigger circuit 32 operates through NAND gate 43 as in case of said fast forward feed and tape feed direction control circuit 2 is triggered by the L pulse of said 2nd trigger circuit so that the output of NAND gate 21 becomes L.

With the above, the tape feed direction is reversed to the slow reverse feed.

When the 1st counter counts through 9999 in subtraction during slow reverse feed, 1st trigger circuit 31 operates through NAND gate 41 as in case of said fast reverse feed and tape feed direction control circuit 2 is triggered by the L pulse of said trigger circuit so that the output of NAND gate 22 becomes L.

With the above, the tape feed direction is reversed to the slow forward feed.

Thus, the tape feed direction is reversed every time each counter counts through 9999 during subtraction and the repetitive feed is performed.

When fast reverse switch Srf is operated in the fast forward feed or fast forward switch Sff is operated in fast reverse feed, trigger operation memory circuit 8 is triggered. For example, in the fast forward feed, the L output of NAND gate 22 of tape feed direction control circuit 2 is applied to 2nd input terminal **44*b* of NAND gate 44 of signal selection circuit 4. In this case, the output of NAND gate 22 is changed from L to H by operating fast reverse switch Srf and accordingly NAND gate 44** operates to generate the output which falls down from H to L.

With the above, 2nd trigger circuit 32 generates the L pulse. This pulse does not affect the tape feed direction control circuit 2 but trigger operation memory circuit 8 is triggered.

Since said trigger operation memory circuit determines stop or temporary stop according to the second triggering operation, a faulty operation is caused by the triggering as described above. To eliminate this fault, fast forward switch Sff and fast reverse switch Srf are connected to the input terminal of NAND 82 through diodes 801 and 802 as shown in the diagram.

Then, when fast forward switch Sff or fast reverse switch Srf is operated, the L pulse is input to the input terminal of NAND gate 82 and trigger operation memory circuit 8 is reset by this pulse. That is to say, the output of NAND gate 81 becomes L.

Accordingly, the second triggering operation after operation of said fast forward switch or fast reverse switch can be correctly detected.

Hereupon, the following describes an application of the apparatus of the present invention in operation starting from fast reverse feed, that is, rewinding operation according to Table 2.

In this case, the change-over switch SA is set in advance to the contact terminal TA side, that is, the temporary-stop/play side.

During rewinding, the 1st counter performs subtraction and the 2nd counter performs addition.

When the 1st counter counts through 8748 and the 2nd counter counts through 1252, only the 1st counter is reset to zero.

Table 2

| Tape feed mode | | Indication of 1st counter | Indication of 2nd counter |
|---|---|---|---|
| | | 8749 | 1251 |
| Fast reverse (rewind) | | 8748 | 1252 |
| | Zero resetting | 0000 | 1252 |
| | S1 ON | 9999 | 1253 |
| | | . | . |
| Change-over | | 9976 | 1276 |
| | | . | . |
| Fast forward | S1 OFF | 9999 | 1253 |
| Temporary stop | | 0000 | 1252 |
| | | 0001 | 1251 |
| | | . | . |
| Slow forward (play) | | 1252 | 0000 |
| | S2 ON | 1253 | 9999 |
| | | . | . |
| Change-over | 1255 | 9997 | |
| | | . | . |
| Slow reverse (reverse play) | S2 OFF | 1253 | 9999 |
| | | . | . |
| | S1 ON | 9999 | 1253 |
| | | . | . |
| Change-over | | 9997 | 1255 |
| Slow forward | | 9998 | 1254 |
| | | . | . |
| | | . | |

That is, the 1st counter is caused to indicate 0000. After this, the 1st counter counts through 9999. At this time, 1st switching means S1 turns on and the forward feed signal is generated.

With this operation, the tape is reversed to fast forward feed when the 1st counter counts through approximately 9976 due to inertia or mechanical delay.

At this time, the 1st counter commences addition and the 2nd counts starts subtraction.

The 1st switching means S1 turns off at the timing when the 1st counter counts again through 9999, and the tape is stopped temporarily.

Since the tape advances actually a little, the tape is stopped temporarily when the 1st counter indicates approximately 0001.

After this, the slow forward feed, that is, play is commenced.

Then, the 2nd counter counts through 9999 when the 1st counter counts through 1253, and accordingly 2nd switching means S2 turns on and the tape is changed over to the reverse feed.

Actually the tape is reversed after slight forward feed and therefore the tape is reversed when the 2nd counter counts through about 9997 and the 1st counter counts through about 1255.

With the above, the 1st counter performs subtraction and the 2nd counter performs addition.

When the 1st counter counts through 9999, the 1st switching means turns on, and the tape is reversed to forward play when the 1st counter counts through approximately 9997.

Thus, the tape can be repeatedly played from the position where the 1st counter is reset to zero during rewinding to the position where the 2nd counter indicates zero. In other words, the range of the repeating play can be set by zero-resetting the 1st counter during rewinding.

On the other hand, in the case that the changeover switch is set to the contact terminal TA' side, the tape can be stopped when the 1st counter indicates approximately 0001.

In case of the conventional equipment, since rewinding is performed at a high speed even though the lever is operated to stop the tape when the counter indicates the specified figure, the tape generally stops after a certain length of advance. It can be said that an error of the stopping position in the apparatus in accordance with the present invention is extremely small since the tape is stopped after slight reverse feed.

Hereupon, the apparatus can be adapted so that the repeat play is not performed during slow feed after the tape has been changed over from fast feed to slow feed.

Figure 6:
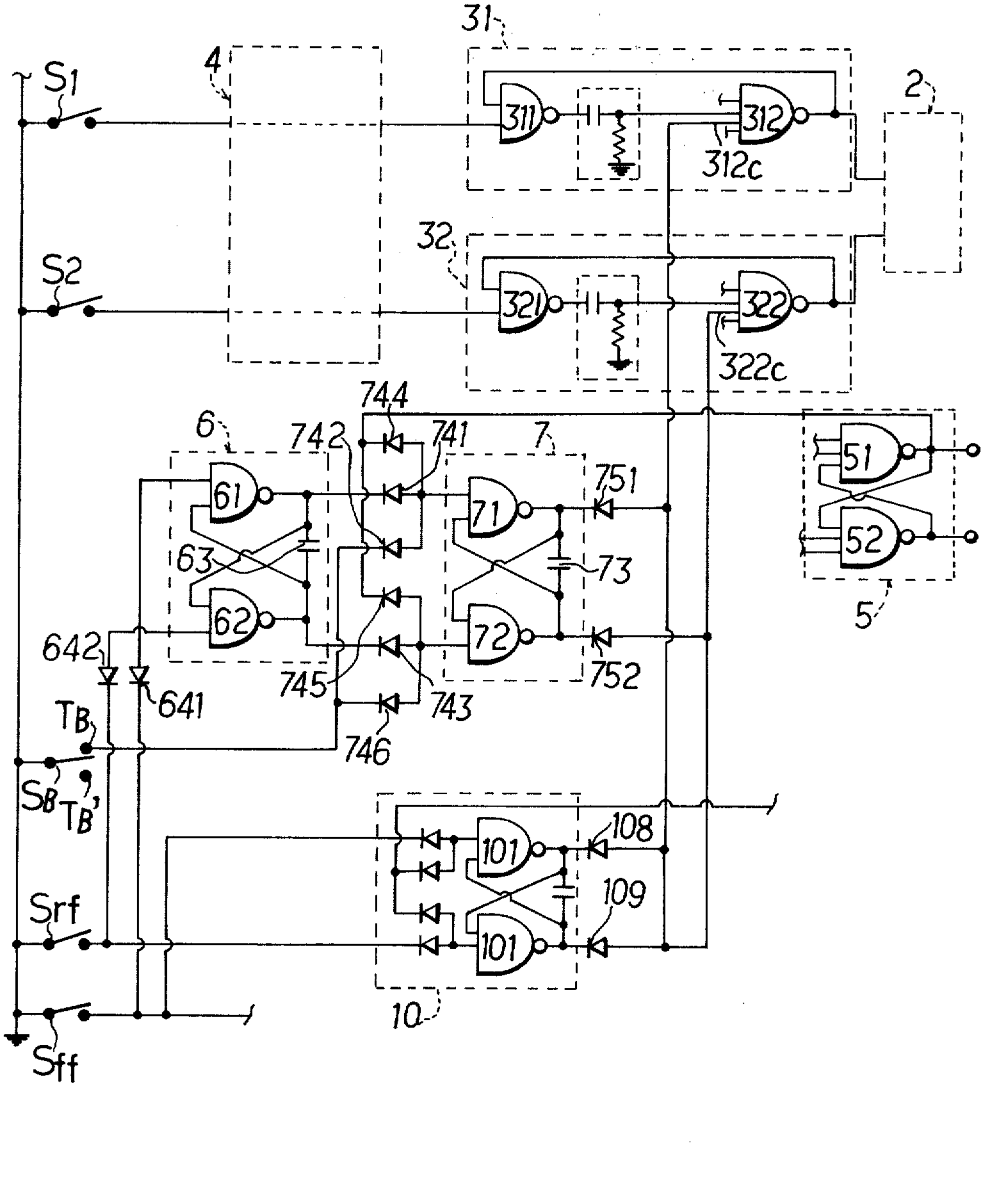
FIG. 6 shows the circuits to be added to the circuits in FIGS. 4*a* and 4*b*.

For example, as shown in FIG. 6, 2nd tape feed direction memory circuit 6 and repeat control circuit 7 can be provided.

2nd tape feed direction memory circuit 6 consists of the flip-flop circuit comprising a pair of NAND gates 61 and 62 and capacitor 63.

Contact terminal Tff of fast forward switch Sff is connected to the input terminal of NAND gate 61 through diode 641 and terminal contact Trf of the fast reverse switch Srf is connected to the input terminal of NAND gate 62 through diode 642.

Repeat control circuit 7 consists of a flip-flop circuit comprising a pair of NAND gates 71 and 72 and capacitor 73.

The output terminal of NAND gate 61 of 2nd tape feed direction memory circuit 6 is connected to the input terminal of NAND gate 71 through diode 741 while the output terminal of NAND gate 62 of tape feed direction memory circuit 6 is connected to the input terminal of NAND gate 72 through diode 743.

The output terminal of NAND gate 71 is connected to 3rd input terminal 322*c* of NAND gate 322 of 2nd trigger circuit 32 through diode 751 while the output terminal of NAND gate 72 is connected to 3rd input terminal 312*c* of NAND gate 312 of 1st trigger circuit 31.

Output terminal 51*e* of NAND gate 51 of tape speed control circuit 5 is connected to the input terminals of NAND gate 71 and 72 through diodes 744 and 745 and contact terminal TB of change-over switch SB is connected to the input terminals of both NAND gates 71 and 72 through diodes 742 and 746.

Said change-over switch SB is used to change over the repeating in slow feed and one-time reversal and is adapted to ground alternatively a pair of contact terminals TB and TB'.

Hereupon, in fast feed, repeat control circuit 7 cannot operate since the L output of NAND gate 51 of tape speed control circuit 5 is input into the input terminals of both NAND gates 71 and 72, whereby the output of NAND gates 71 and 72 is H, both trigger circuits are not controlled by said repeat control circuit 7 and said operation becomes possible regardless of the position of change-over switch SB.

When the tape is changed over from fast feed to slow feed while change-over switch SB is kept, set to contact terminal TB side, the L output from contact terminal TB is input into the input terminals of both NAND gates 71 and 72 and therefore repeat control circuit 7 cannot operate. Since the output of NAND gates 71 and 72 is H, both trigger circuits 31 and 32 are not controlled by said repeat control circuit 7 in case of fast feed and the repeat feed becomes possible as described above.

When the tape is changed over from fast feed to slow feed while change-over switch SB is kept set to contact terminal TB' side, the repeat control circuit 7 can operate. In this case, 2nd tape feed direction memory circuit 6 stores the operation of fast forward switch Sff or fast reverse switch Srf which has been operated last.

When fast forward switch Sff is operated, the L pulse is input into the input terminal of NAND gate 61 and the output of NAND gate 62 is triggered at L.

On the other hand, when fast reverse switch Srf is operated, the L pulse is input into the input terminal of NAND gate 62, the output of NAND gate 61 is triggered at L.

Accordingly, when the tape operation is changed over to fast forward feed by 1st switching means S1 and the 1st trigger circuit 31 after fast reverse feed is commenced by operating the fast reverse switch Srf and then, when the tape is changed over to slow forward feed after temporary stop, the L output of NAND gate 61 is input into NAND gate 71 through diode 741 and repeat control circuit 7 is triggered so that the output of NAND gate 72 becomes L. This output is input into NAND gate 312 of 1st trigger circuit 31 and NAND gate 312 of 1st trigger circuit 31 cannot operate.

In other words, the 2nd trigger circuit 32 can operate.

Thus, when only 2nd trigger circuit 32 can operate, only 2nd switching means S2 is effective.

Accordingly, the tape feed direction is changed over only when the 2nd counter counts through 9999 during subtraction after slow forward feed has been commenced. The tape is not changed over after it has been changed over from slow forward feed to slow reverse feed. Thus, "one-time reversal" is set.

This is the same in the case that the tape operation is changed over to fast reverse feed after fast forward feed has been commenced by operating fast forward switch Sff and is changed to slow reverse feed after temporary stop. In this case, 2nd tape feed direction memory circuit 6 memorizes the operation of fast forward switch Sff and only the 1st trigger circuit can therefore operate. Accordingly, only 1st switching means S1 of the 1st counter is effective and the tape is changed over only when 1st counter counts through 9999 during subtraction after slow reverse feed has been commenced.

In other words, the tape is not changed over after changing over from slow reverse feed to slow forward feed.

The above description relates to an embodiment of the present invention according to which the digit wheels of the counters are provided with the 1st and 2nd switching means, that is, the 1st and 2nd signal generating means for generating the tape feed control signals.

To complete the object of the present invention, however, the signal generating means need not be provided on the digit wheels of the counters. A pair of signal generating means such as, for example, switches can be provided on each rotary means which rotates in accordance with the tape feed and can be independently reset to a specified position, and said rotary means need not be the counters which measure the length of a tape which has been fed.

Figure 7:
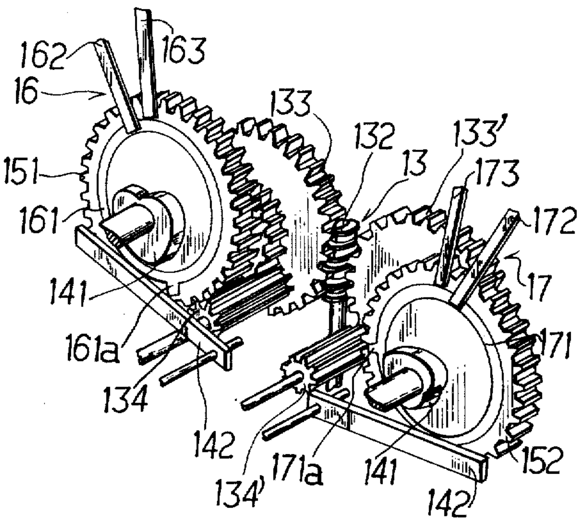
FIG. 7 is a perspective view illustrating an embodiment of the 1st and 2nd rotating means which are comprised of rotary members which are not counters, for the apparatus according to the present invention.

For example, as shown in FIG. 7, rotary members 151 and 152 are made as discs without digital numbers on their peripheries and are adapted to rotate with rotation of the pulley shafts (not shown) which is transmitted by transmitting means 13.

In this case, the 1st rotary member is adapted to rotate clockwise during forward feed and counterclockwise during reverse feed while the 2nd rotary member is adapted to rotate counterclockwise during forward feed and clockwise during reverse feed.

1st rotary member 151 and 2nd rotary member 152 are provided respectively with resetting means 14 similar to that of the embodiment shown in FIG. 1 and are adapted so that drive gears 134 and 134′ of said transmission means are disengaged from the rotary members when reset button 143 is operated and are independently reset to the specified positions.

Both the rotary members are provided respectively with signal generating means 16 and 17 which generate the signal when the rotary members rotate exceeding the resetting positions.

These signals generating means comprise conductive surfaces 161 and 171 which are made in an annular form and partly provided detecting parts 161*a* and 171*a* which are extended toward the circumference, contacts 162 and 172 which always contact said conductive surfaces and contacts 163 and 173 which can contact said detecting parts 161*a* and 171*a* of said conductive surfaces when said rotary members are at the specified positions.

Figure 8A:
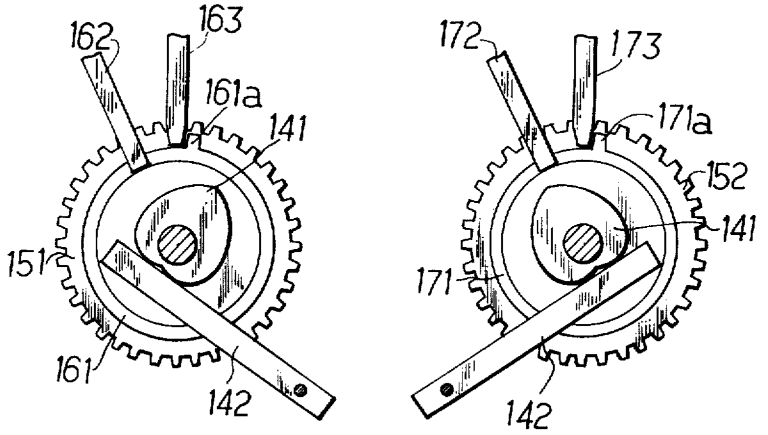
FIGS. 8*a* and 8*b* are respectively a sketch showing the resetting position of said rotary members shown in FIG. 7.

Contacts 163 and 173 are arranged at the positions where said contacts are located close to the extreme ends of the counterclockwise side of detecting parts 161*a* and 171*a* of the conductive surfaces when the rotary members are at the resetting positions as shown in FIG. 8*a*. Accordingly, when 1st rotary member 151 rotates counterclockwise over the resetting position and contact 163 contacts detecting part 161*a*, contacts 162 and 163 become conductive and generate the ON signal. Similarly, when the 2nd rotary member 152 rotates counterclockwise over the resetting position, contacts 172 and 173 become conductive and generate the ON signal. The circuit sections can be formed as same as said embodiment and its operation is basically identical to the embodiment except that the rotary members are the digit wheels of the counters or not.

Figure 8B:
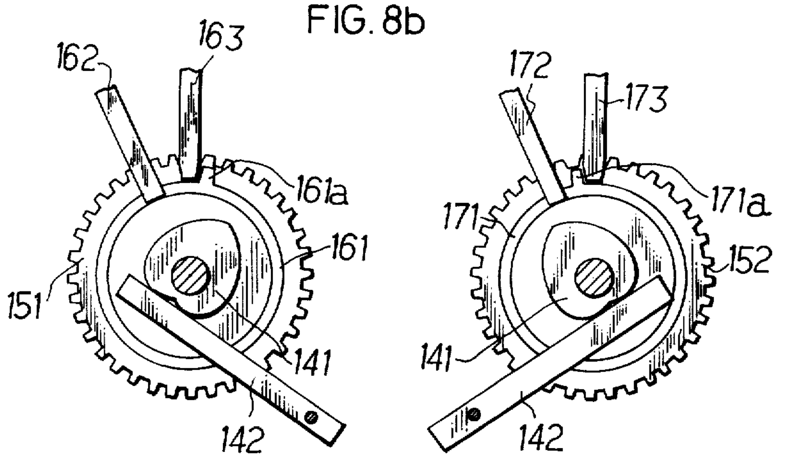

Both rotary members 151 and 152 can be adapted so that these rotary members rotate in the same direction, that is, 1st rotary member 151 and 2nd rotary member 152 rotate clockwise in forward feed and counterclockwise in reverse feed. In this case, as shown in FIG. 8*b*, when 1st rotary member 151 is in the resetting position, contact 163 is provided at a position close to the counterclockwise extreme end of detecting part 161*a* of the conductive surface and, when 2nd rotary member 152 is in the resetting position, contact 173 is provided at a position close to the clockwise extreme end of detecting part 171*a* of the conductive surfaces.

Figure 9:
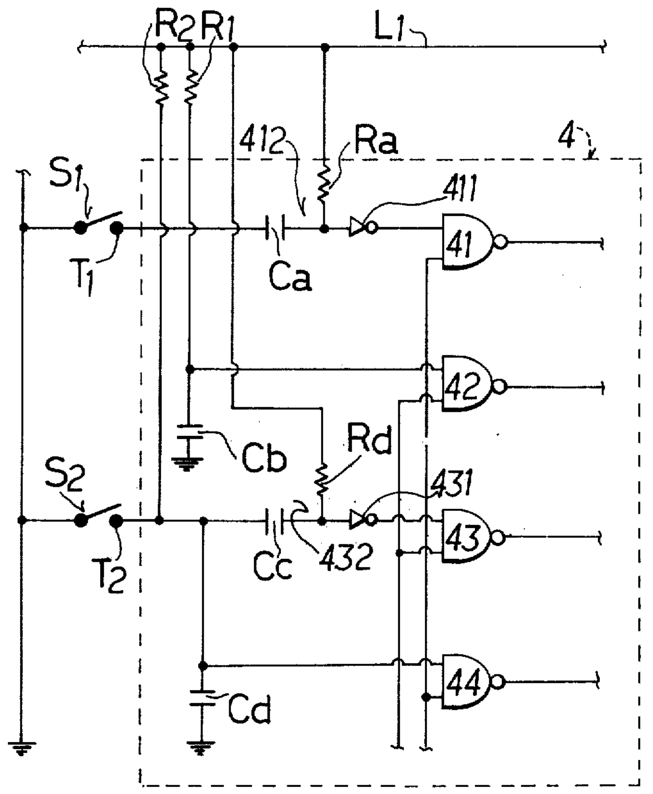
FIG. 9 is a partial circuit diagram illustrating another embodiment of the signal selection circuit, and, FIG. 10 is a partial circuit diagram illustrating another embodiment of the 1st trigger circuit and simultaneously an embodiment of the 2nd trigger circuit with a number in parentheses.

Referring to FIG. 9, there is shown another embodiment of signal selection circuit 4. Capacitor Ca of differentiation circuit 412 is connected to terminal T1 of 1st switching means S1 and inverter 411 is connected between said capacitor C*a* and NAND gate 41. Resistor Ra of differentiation circuit 412 is connected to power supply line L1. Capacitor C*b* to prevent noise is connected between contact terminal T1 and the ground. Similarly, differentiation circuit 432 and inverter 431 are connected between 2nd switching means S2 and NAND gate 43 and capacitor C*d* to prevent noise is connected.

The circuit of the construction described above operates as the circuit shown in FIG. 4*a*. The former circuit increases the stability against temperature variation more than in the latter circuit.

Figure 10:
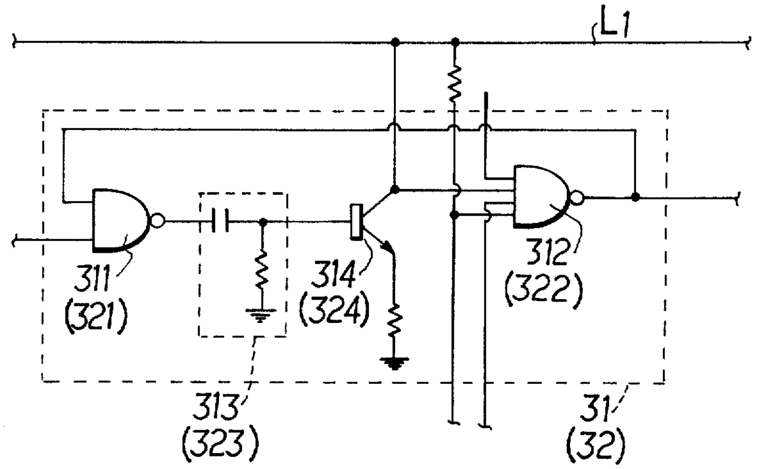

Referring to FIG. 10, there is shown a circuit in which NPN transistor 314 is connected between differentiation circuit 313 and NAND gate 312 of 1st trigger circuit 31. NPN transistor 324 can be connected to 2nd trigger circuit 32 as shown with a number in parentheses in FIG. 10. In this arrangement, the stability against temperature variation of both trigger circuits is increased as compared with the circuit shown in FIG. 4*a*.

As described above, the apparatus according to the present invention is capable of stopping a tape at a specified position with less error by resetting the rotating means in an operation started from fast feed or rewind, automatically repeating the feeding of a tape in a specified setting range after stopping the tape through it depends on the construction and performing one-time reverse feed after feeding the tape to a specified position when the tape is stopped.

Accordingly, the apparatus of the present invention is free from inconvenience such as the control by the conventional sensing tape and can perform setting and resetting while the tape is fed, thus improving the functions of the tape recorder.

What is claimed is:

1. A tape feed control apparatus comprising a. a first rotating means which rotates in accordance with feeding of a tape in a direction which is changed over to an opposite direction when said tape is changed over from forward feed to reverse feed and from reverse feed to forward feed, b. a second rotating means which rotates in accordance with feeding of a tape in a direction which is changed over to an opposite direction when said tape is changed over from forward feed to reverse feed and from reverse feed to forward feed, c. a first resetting means which resets said first rotating means to a specified position independently of said second rotating means, d. a second resetting means which resets said second rotating means to a specified position independently of said first rotating means, e. a first signal generating means which generates a signal when said first rotating means rotates exceeding the resetting position from any direction, f. a second signal generating means which generates a signal when said second rotating means rotates exceeding the resetting position from any direction, g. a tape feed direction control circuit which sets alternatively an operation mode for which a forward feed signal to perform forward feed of the tape is generated and an operation mode for which a reverse feed signal to perform reverse feed of the tape is generated, h. a tape speed control circuit which sets alternatively a fast feed mode to generate a fast feed signal for fast feed of a tape and a reverse feed mode to generate a reverse feed signal for reverse feed of a tape, i. a fast forward switch which triggers said tape feed direction control circuit so that said tape feed direction control circuit comes in a forward feed mode and triggers said tape speed control circuit so that said tape speed control circuit comes in a fast feed mode, j. a fast reverse switch which triggers said tape feed direction control circuit so that said tape feed direction control circuit comes in a reverse feed mode and triggers said tape speed control circuit so that said tape speed control circuit comes in a fast feed mode, k. a coupling means which transmits a signal from said first signal generating means to said tape feed direction control circuit to change over said tape feed direction control circuit from a reverse feed mode to a forward feed mode and transmits a signal from said second signal generating means to said tape feed direction control circuit to change over said tape feed direction control circuit from a forward feed mode to a reverse feed mode, l. a fast feed direction memory circuit which memorizes the latest operations of said fast forward switch and fast reverse switch and controls said coupling means to prevent said coupling means from transmitting the signal of said first signal generating means to said tape feed direction control circuit when the operation of the fast forward switch is memorized and from transmitting the signal of said second signal generating means to said tape feed direction control circuit when the operation of the fast reverse switch is memorized, m. a memorizing means which is triggered each time said coupling means transmits signals from both said signal generating means to said tape feed direction control circuit, and n. a tape stopping means which operates to stop the tape when said memorizing means is triggered at the second time subsequently with the signal from one of said signal generating means.

2. An apparatus in accordance with claim 1, wherein said first signal generating means comprises a first switching means which turns on and off according to rotation of said first rotating means and said second signal generating means comprises a second switching means which turns on and off according to rotation of said second rotating means.

3. An apparatus in accordance with claim 1, wherein both said signal generating means are adapted to generate first level outputs when these signal generating means operate and second level outputs when the signal generating means do not operate, thereby said first signal generating means is adapted to operate so that the output changes from the second level to the first level when the first rotating means rotates from the resetting position in a direction in which the first rotating means rotates in the reverse feed of the tape and the output changes from the first level to the second level when the first rotating means rotates to the resetting position in a direction in which the first rotating means rotates in the forward feed of the tape and said second signal generating means is adapted to operate so that the output changes from the second level to the first level when the second rotating means rotates from the resetting position in a direction in which the second rotating means rotates in the forward feed of the tape and the output changes from the first level to the second level when the second rotating means rotates to the resetting position in a direction in which the second rotating means rotates in the reverse feed of the tape.

4. An apparatus in accordance with claim 3, wherein said coupling means comprises a first trigger circuit which operates to trigger said tape feed direction control circuit so that said tape feed direction control circuit comes in a forward feed mode, a second trigger circuit which triggers said tape feed direction control circuit so that the tape feed direction control circuit comes in a reverse feed mode and a signal selection circuit which is adapted to selectively transmit output signals having a varying level from said first switching means to the first trigger circuit so that a signal which changes from the first level to the second level does not actuate the first trigger circuit and a signal which changes from the second level to the first level actuates the first trigger circuit in the reverse feed and a signal which changes from the second level to the first level does not actuate the first trigger circuit and a signal which changes from the first level to the second level actuates the first trigger circuit in the forward feed and to selectively transmit output signals having a varying level from said second generating means to the second trigger circuit so that a signal which changes from the first level to the second level does not actuate the second trigger circuit and a signal which changes from the second level to the first level actuates the second trigger circuit in the forward feed and a signal which changes from the second level to the first level does not actuate the second trigger circuit and a signal which changes from the first level to the second level actuates the second trigger circuit in the reverse feed.

5. An apparatus in accordance with claim 4, wherein said memorizing means comprises a trigger operation memory circuit which is connected to said first and second trigger circuits, thereby said trigger operation memory circuit is triggered each time each of said trigger circuits operates.

6. An apparatus in accordance with claim 1, wherein said stop means comprises a temporary stop circuit which generates a temporary stop signal to stop a tape for a predetermined period of time and said tape speed control circuit is controlled to come in the slow feed mode by said memorizing means and to cause said temporary stop circuit to generate a temporary stop signal when said memorizing means is triggered at the second time subsequently.

7. An apparatus in accordance with claim 1, wherein said stop means comprises a temporary stop circuit which generates a temporary stop signal to stop a tape for a predetermined period of time and a stop circuit which generates a stop signal to stop continuously the tape, thereby a selecting means selects alternatively a state in which said tape speed control circuit is controlled to come in the slow feed mode by said memorizing means and to cause said temporary stop circuit to generate a temporary stop signal and a state in which said stop circuit is forced to generate a stop signal by means of said memorizing means, when the memorizing means is triggered at the second time subsequently.

8. An apparatus in accordance with claim 1, wherein said stop means comprises a stop circuit which generates a stop signal to stop continuously the tape, said stop circuit being forced to generate a stop signal by means of said memorizing means when the memorizing means is triggered at the second time subsequently.

9. An apparatus in accordance with claim 1 further comprising a second tape feed direction memory circuit which memorizes the latest operations of said fast forward switch and fast reverse switch and a repeat control circuit which controls said coupling means so that the coupling means does not transmit a signal from one of both said signal generating means to the tape feed direction control circuit according to an information memorized by said second tape feed direction memory circuit, wherein said repeat control circuit is adapted not to control said coupling means while said tape speed control circuit is in a fast feed mode and to control said coupling means so that the coupling means does not transmit a signal from said second signal generating means to the tape feed direction control circuit when said second tape feed direction memory circuit memorizes an operation of the fast forward switch and the coupling means does not transmit a signal from said first signal generating means to the tape feed direction control circuit when said second tape feed direction memory circuit memorizes an operation of the fast reverse switch while said tape speed control circuit is in the slow feed mode.

10. An apparatus in accordance with claim 1, wherein said first rotating means comprises a first counter which has a plural number of digit wheels which indicate respectively each digital value of a counted figure in a plural number of digits and rotate in a direction in which an indicated value increases through addition during forward feed of the tape and rotate in a direction in which an indicated value decreases through subtraction during reverse feed of the tape while said second rotating means comprises a second counter which has a plural number of digit wheels which indicate respectively each digital value of a counted figure in a plural number of digits and rotate in a direction in which an indicated value decreases through subtraction during forward feed of the tape and rotate in a direction in which an indicated value increases through addition during forward feed of the tape, and said first signal generating means is provided at the specified digit wheel other than the unit-position digit wheel of said first counter and generates a signal when said specified digit wheel rotates in the direction for subtraction from the resetting position to change its indicating value and rotates in the direction for addition to the resetting position to change its indicating value to a value at the resetting position while said second signal generating means is provided at the specified digit wheel other than the unit-position digit wheel of said second counter and generates a signal when said specified digit wheel rotates in the direction for subtraction from the resetting position to change its indicating value and rotates in the direction for addition to the resetting position to change its indicating value to a value at the resetting position.

11. An apparatus in accordance with claim 9, wherein both said counters are adapted so that indicating values at the resetting positions of the specified digit wheels which are respectively provided with the signal generating means are zero and said signal generating means are adapted to generate a signal when said specified digit wheels rotate from the zero indicating position to the 9-indicating position and rotate from the 9-indicating position to the zero indicating position.

* * * * *